Figure 5:
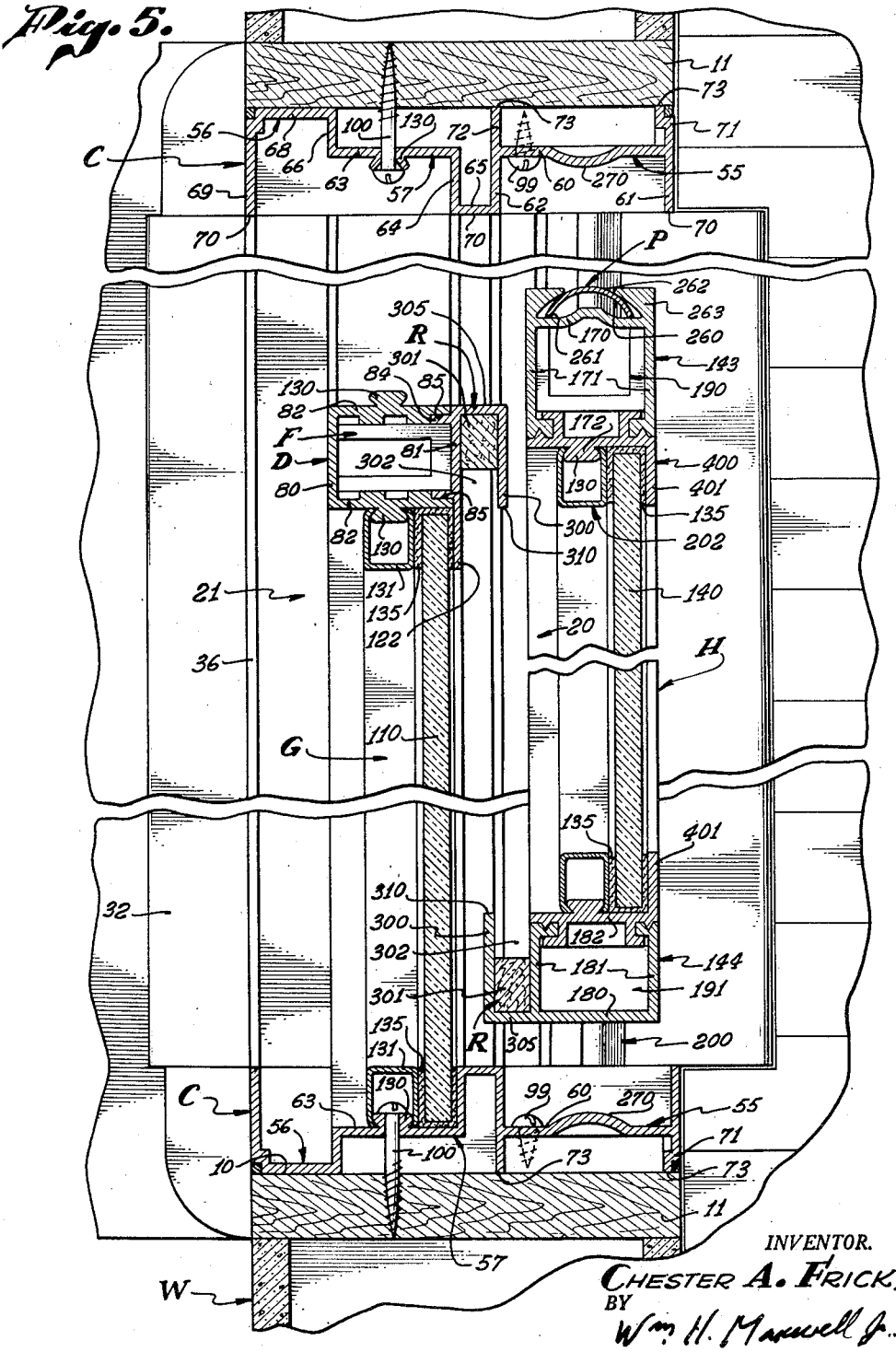

April 9, 1957 C. A. FRICK 2,788,097
CLOSURE CONSTRUCTION FOR BUILDINGS
Filed Aug. 17, 1953 9 Sheets-Sheet 1
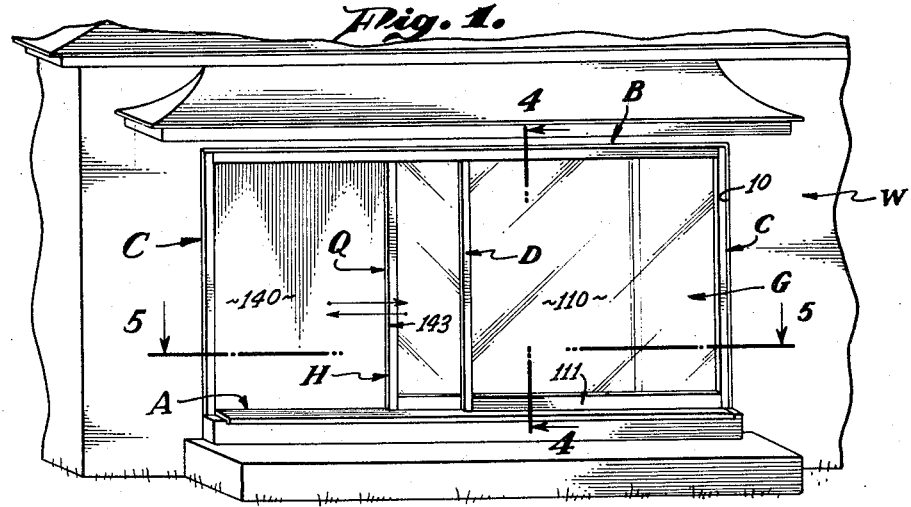
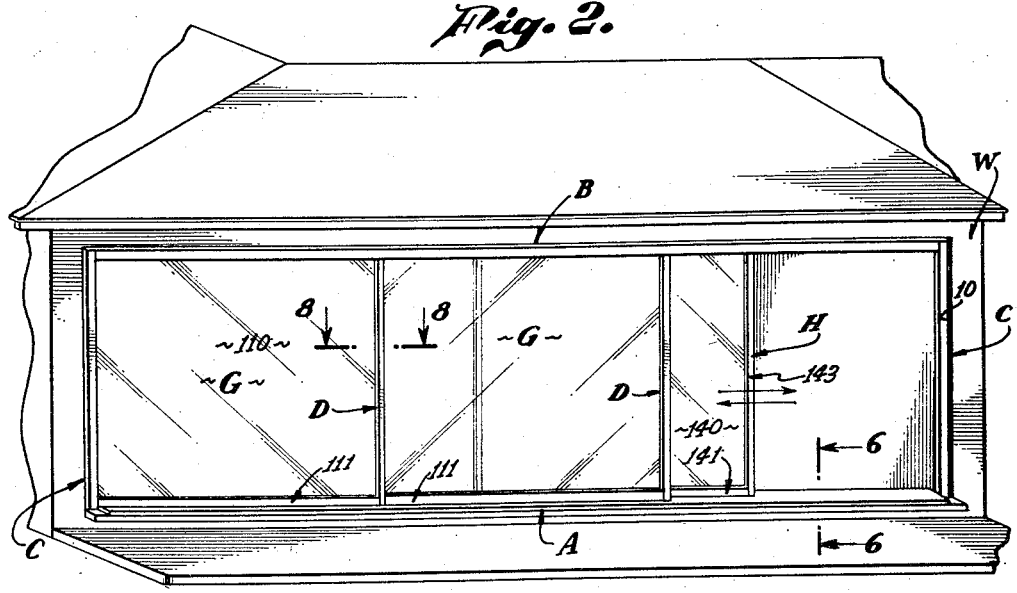
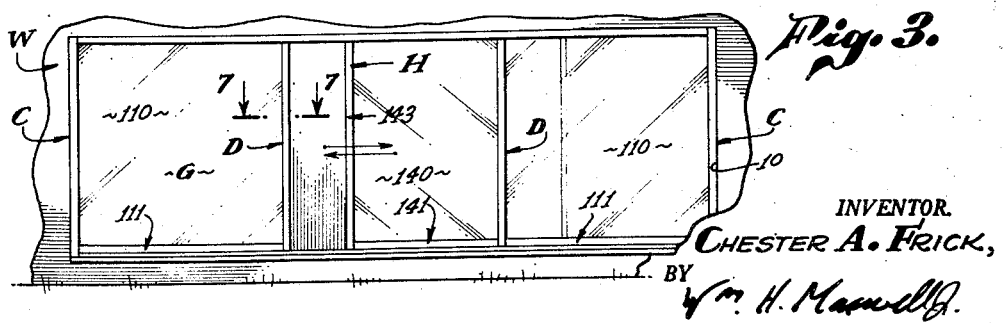
INVENTOR.
CHESTER A. FRICK,
BY
Wm. H. Maxwell
ATTORNEY.

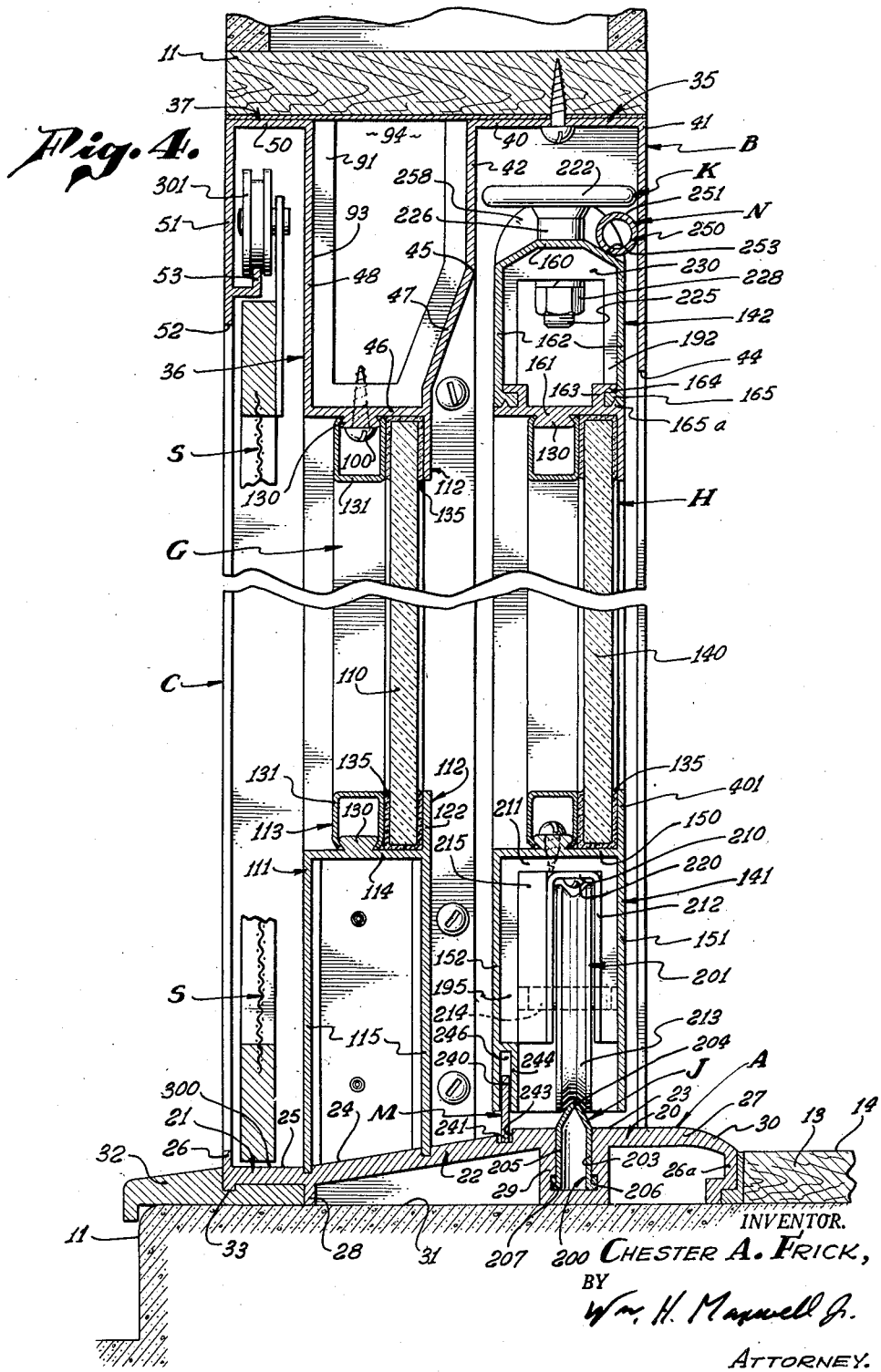

April 9, 1957 C. A. FRICK 2,788,097
CLOSURE CONSTRUCTION FOR BUILDINGS
Filed Aug. 17, 1953 9 Sheets-Sheet 3

INVENTOR.
CHESTER A. FRICK,
BY
Wm. H. Maxwell Jr.
ATTORNEY.

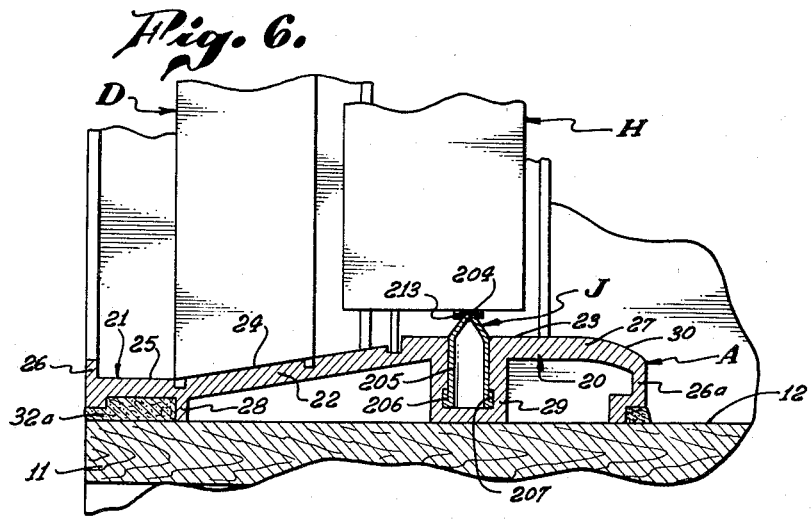
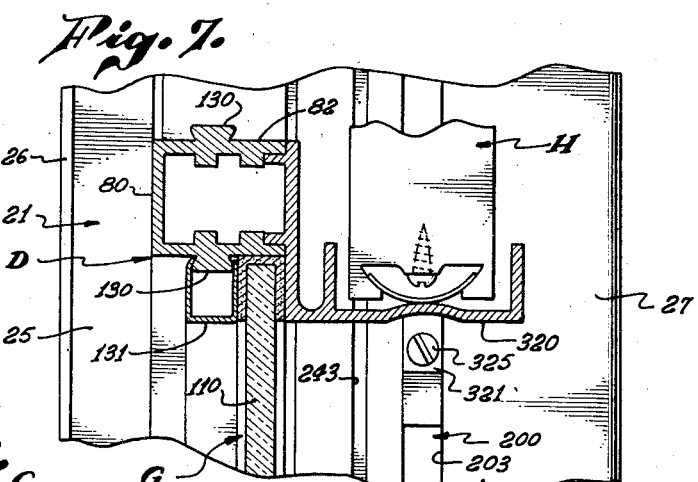
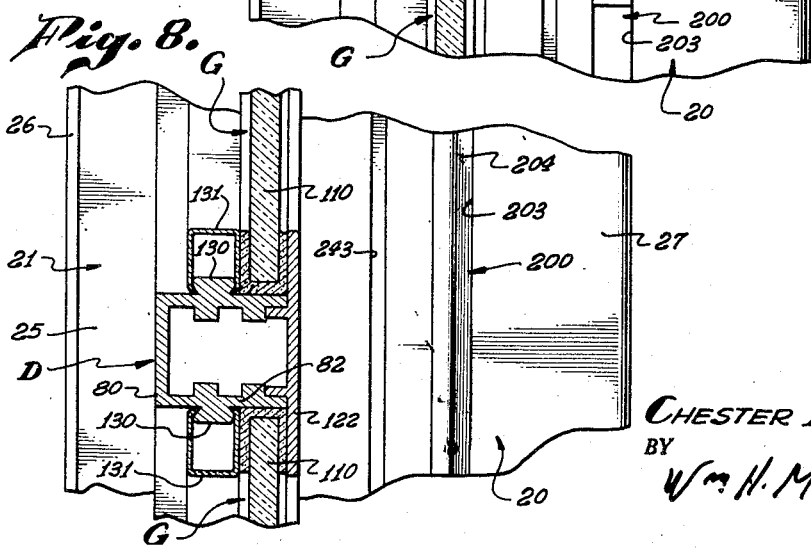

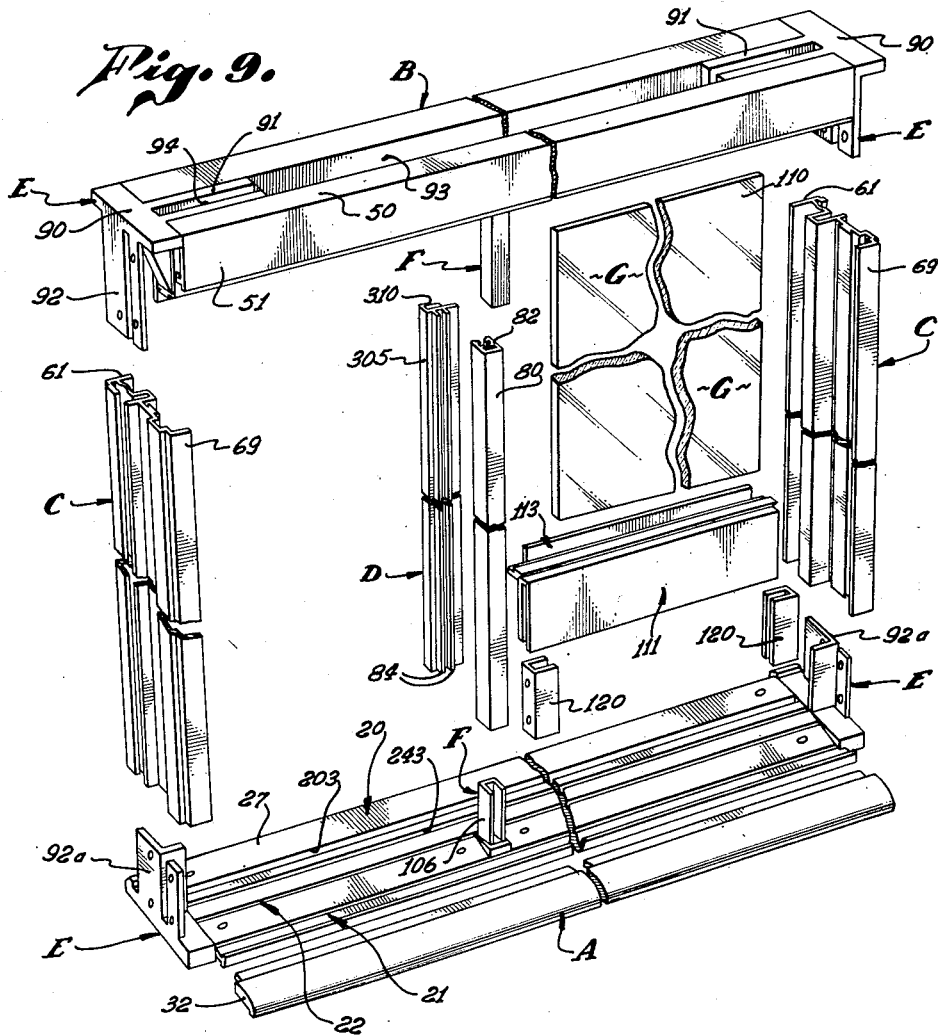

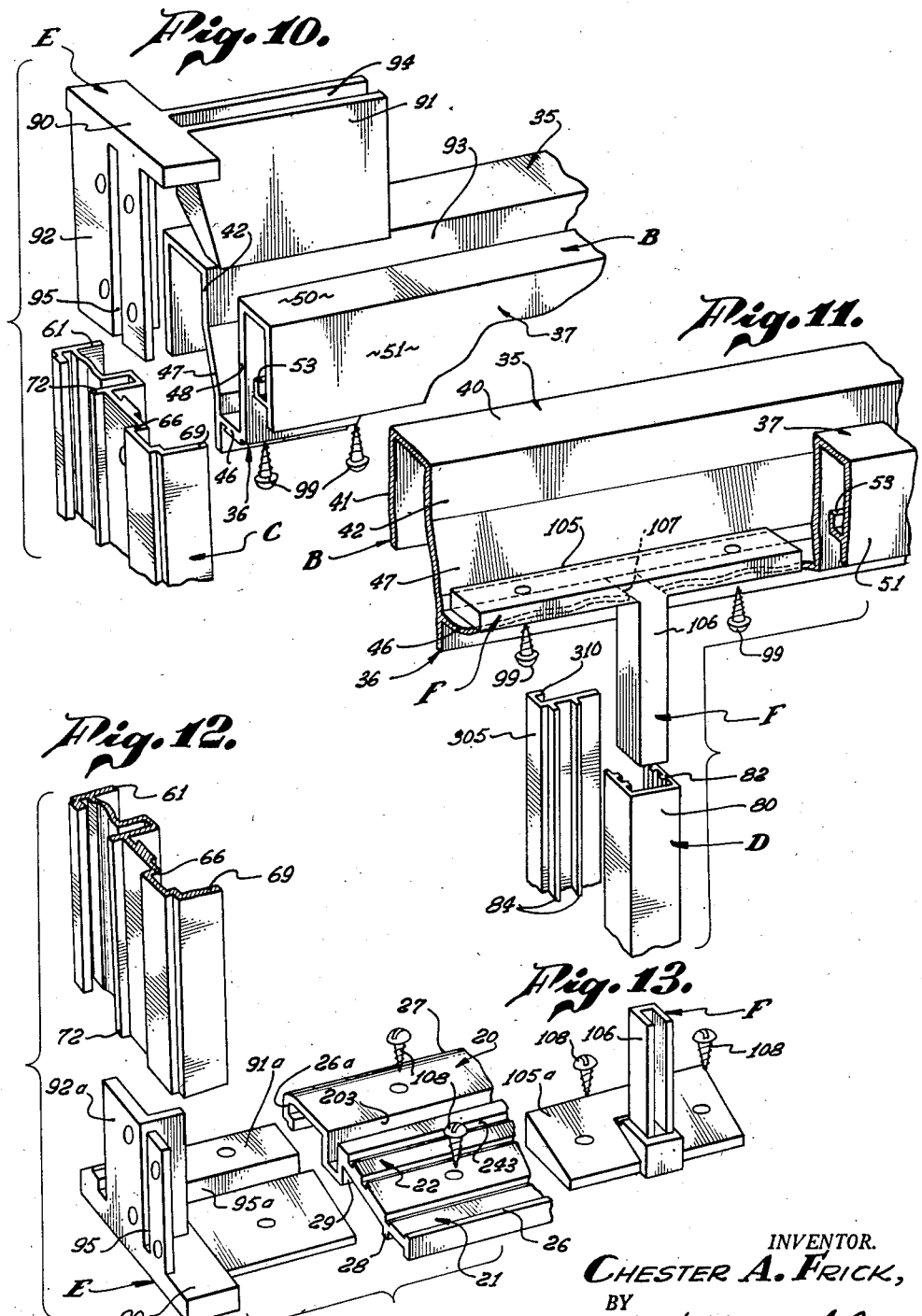

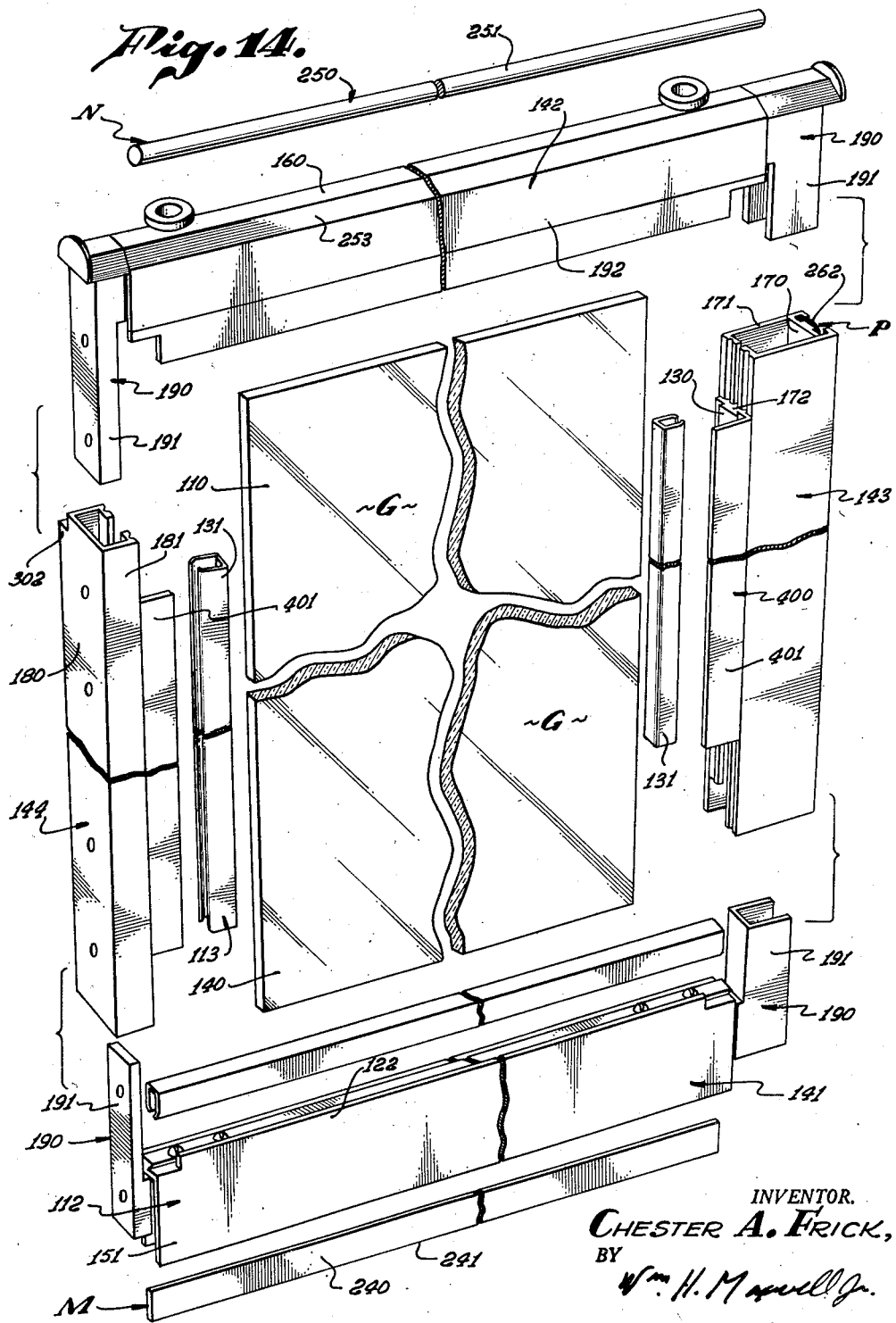

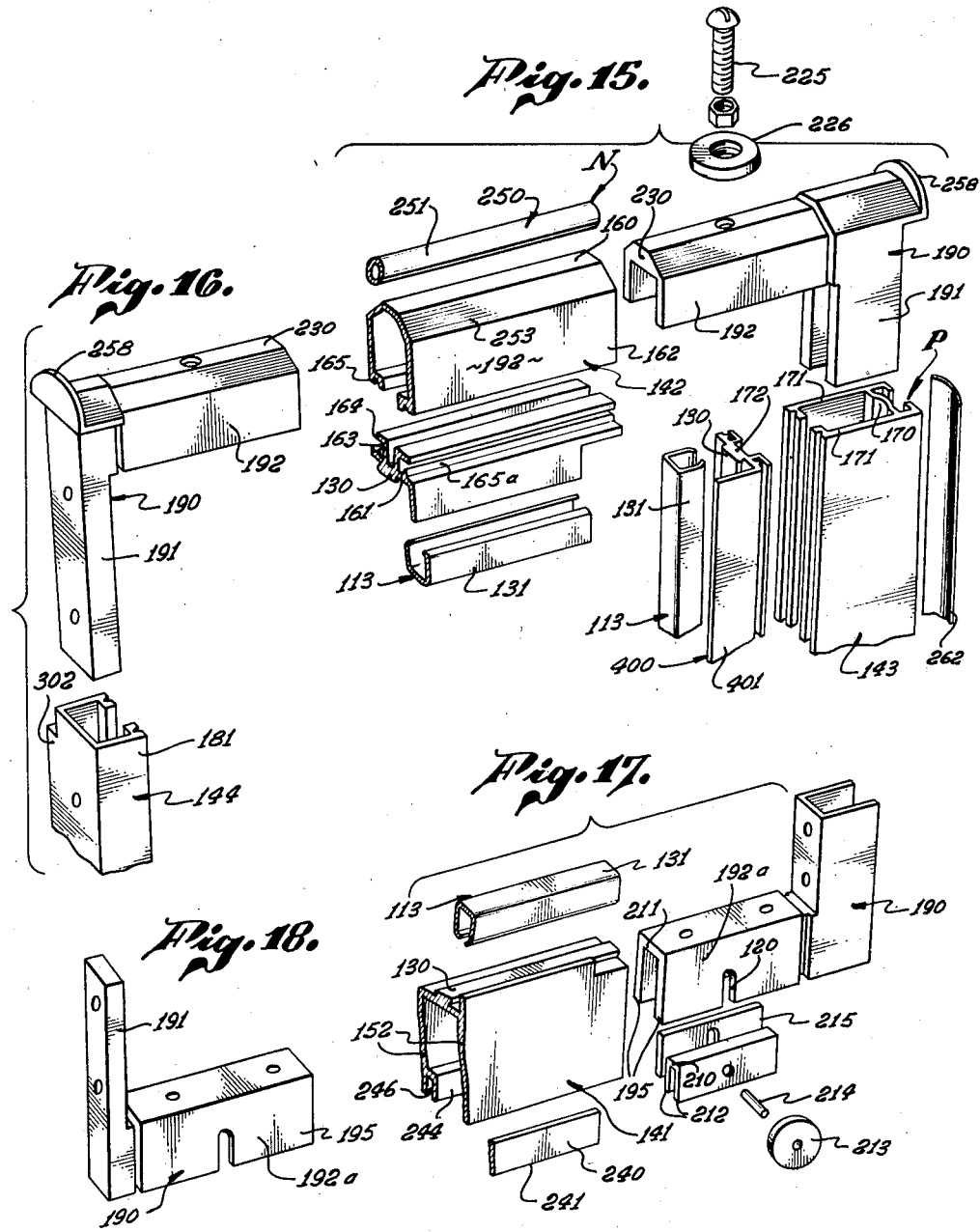

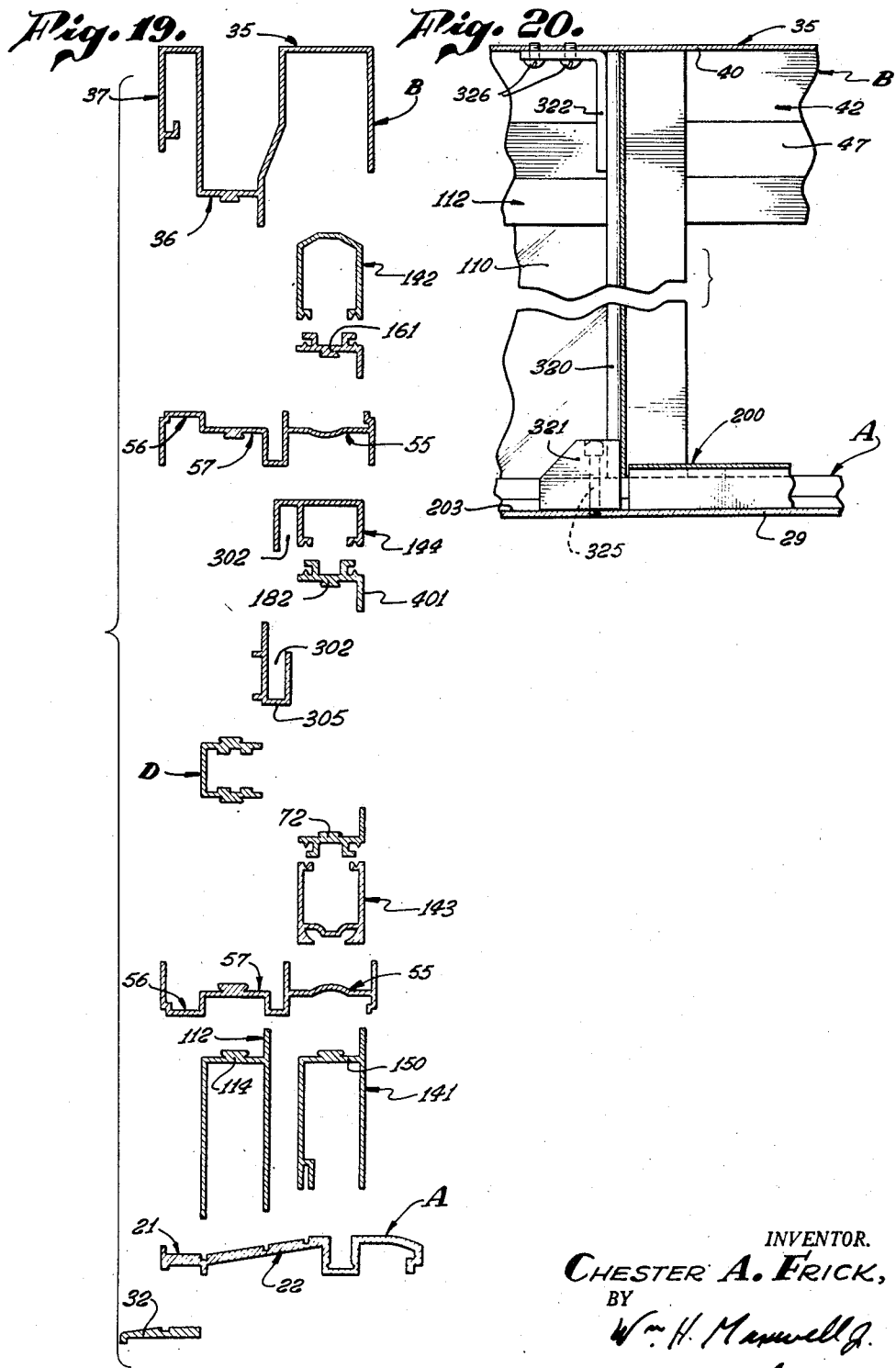

United States Patent Office 2,788,097
Patented Apr. 9, 1957

2,788,097

CLOSURE CONSTRUCTION FOR BUILDINGS

Chester A. Frick, Los Angeles, Calif., assignor, by mesne assignments, to Karl Reinhard, Anaheim, Calif.

Application August 17, 1953, Serial No. 374,495

5 Claims. (Cl. 189—64)

This invention has to do with a closure construction for buildings, and it is a general object of the invention to provide a simple, practical, improved construction applicable to or adapted to be mounted in a wall of a building at an aperture provided therein and providing one or more closures, which closures may be fixed or movable, or part fixed and part movable.

Buildings of various kinds are provided with walls having openings or apertures and in such apertures closure units or constructions of various kinds are employed. In some cases a fixed or immovable closure is provided, in other cases a movable closure is provided, while in other cases various combinations of fixed and movable closures are provided. It has long been common to provide closure structures of the general character referred to, in the walls of buildings by, in effect, building them in the course of basic building construction so that they are truly integral parts of the building. In other cases such structures have been provided as inserts, for instance, window type closures have been provided as units insertable in walls and, likewise, door constructions have been provided for such application. Further, the prior art has provided closure structures of the general character referred to which are primarily metal structures carrying or provided with glass panels and these have, in effect, been such as to require fitting and building into the wall as the wall is established, have required a considerable degree of skill on the part of metal workers, have involved considerable fitting or working of metal parts as incorporation with the wall progress and have, because of such circumstances, involved considerable cost and are not always altogether satisfactory.

It is a general object of this invention to provide a closure construction which is of simple, inexpensive form and construction, and which is applicable to an opening in a wall to establish a finished, practicable, working construction without resort to the exercise of the special skill or services of a metal worker and without involving complicated time-consuming cutting and fitting operations.

Another object of this invention is to provide a closure structure of the general character referred to wherein the various elements entering into the structure may be assembled in a knock-down condition and in compact form for transportation and final delivery to the point of installation, where the parts can be easily and quickly assembled and with few simple operations fitted to and made ready for operation in a wall.

It is another object of this invention to provide a closure construction of the general character referred to wherein the major part or bulk of the metal parts involved may, in practice, be formed as simple unitary elongate precision extrusions, while the balance of the parts are mainly precision castings that can likewise be produced economically.

It is an object of the present invention to provide a closure structure of the general character referred to involving such construction, arrangement and formation of parts as to minimize joints and fitted constructions and such that the majority of cuts made or required in establishing the structure are simple, close fitting, straight cuts that can be made quickly, conveniently and economically.

It is a further object of this invention to provide a closure structure of the general character referred to which is such that with a given group of parts or elements it is possible by suitable assembly to establish closures of various types, that is, closure involving various arrangements and relationships or fixed and movable closures.

It is a further object of this invention to provide a closure structure of the general character referred to wherein a glass panel employed in establishing a fixed closure is effectively supported and is retained in working position by very simple, inexpensive, easily and quickly applied construction, that is neat in appearance as well as being highly durable and efficient.

It is another object of this invention to provide a closure structure of the general character referred to wherein a movable element is provided and is supported efficiently and dependably to move or shift freely while being effectively and securely maintained and assembled with the other parts of the structure.

It is a further object of this invention to provide a closure structure of the general character referred to including various features in connection with or incidental to the movable closure, to the end that the movable closure is effectively sealed in the structure so that there is no appreciable draft or leakage of air past the closure when it is in the closed position.

Another object of this invention is to provide a closure structure of the general character referred to which is such that the several parts or elements entering into the structure are so formed and related as to be easily, quickly and accurately assembled, as at a location where the structure is to be used without resort to special tools or equipment and without requiring the exericse of special care or skill.

The various objects and features of my invention will be fully understood from the following detailed description of typical preferred forms and applications of my invention, throughout which description reference is made to the accompanying drawings, in which:

Fig. 1 is a perspective view illustrating a typical exterior wall of a building having an opening therein carrying structure as provided by the present invention, and showing an embodiment of the invention wherein there is one fixed closure and one movable closure, the movable closure being shown partly open. Fig. 2 is a view similar to Fig. 1 showing somewhat different embodiment or application of the invention wherein there are two fixed closures and one movable closure, the fixed closures being arranged adjoining each other and the movable closure being arranged at one end of the assembly formed by the fixed closures. Fig. 3 is a view similar to Figs. 1 and 2 and illustrating a construction wherein there are two fixed closures spaced apart and a movable closure between the fixed closures. Fig. 4 is an enlarged detailed vertical sectional view taken substantially as indicated by line 4—4 on Fig. 1. Fig. 5 is an enlarged plan section taken substantially as indicated by line 5—5 on Fig. 1. Fig. 6 is an enlarged detailed sectional view taken as indicated by line 6—6 on Fig. 2. Fig. 7 is an enlarged plan section taken as indicated by line 7—7 on Fig. 3. Fig. 8 is an enlarged plan section taken as indicated on line 8—8 on Fig. 2. Fig. 9 is a so-called exploded view of parts as provided by the present invention and as shown in Fig. 1 of the drawings, the parts being shown separated as at the corners or joints and the structure being shown without the movable closure. Fig. 10 is an enlarged detailed sectional view of parts of the structure as shown in Fig. 9, being a view illustrating the parts at the upper left hand corner of Fig. 9. Fig. 11 is an enlarged detailed perspective view of parts as shown in Fig. 9, being a view of the structure shown at the upper middle portion of Fig. 9 and having certain parts broken away to illustrate details of construction. Fig. 12 is an enlarged sectional view of the portion of structure shown in Fig. 9 showing the parts at the lower lefthand corner of Fig. 9 and showing the parts separated in a manner to illustrate details of construction. Fig. 13 is an enlarged detailed perspective view of a portion of the structure shown in Fig. 9 showing the portion of that structure at the lower central part of Fig. 9. Fig. 14 is a view similar to Fig. 9, being a so-called exploded view illustrating the various details of the movable closure, which is not present in Fig. 9. Fig. 15 is an enlarged detailed sectional view of a portion of the structure shown in Fig. 14, showing that portion of the structure illustrated in the upper right hand corner of Fig. 14. Fig. 16 is an enlarged detailed sectional view of a portion of the structure shown in Fig. 14, showing the parts at the upper left hand corner of Fig. 14. Fig. 17 is an enlarged detailed perspective view of a portion of parts as shown in Fig. 14, showing the parts occuring at the lower right hand corner of Fig. 14 with the parts exploded to illustrate their relationship. Fig. 18 is an enlarged perspective view of a coupling illustrated in Fig. 14 at the lower left hand corner of the structure, the coupling being shown separate from the other parts. Fig. 19 is a somewhat diagrammatic view illustrating in line or in aligned relation the various elements entering into the structure shown in Fig. 1, and which are the elements that, in practice, can be advantageously formed as extrusions. Fig. 20 is an elevational view of the structure of Fig. 7 as viewed from the right. The construction embodying the present invention is adapted to be applied to or incorporated in a wall W, for instance, at or in an opening 10 provided in a wall, and the wall may be an exterior wall of the building as shown in Fig. 1, or any wall of a building or like structure. The structure of the present invention is particularly practical as applied to an exterior wall as, for instance, to the wall of a residential structure and it is therefore illustrated in the drawings in such a situation.

In accordance with the present invention the structure provided may involve a multiplicity of closure elements, and one or more of these may be fixed or stationary, while one or more may be movable or shiftable. On Sheet 1 of the drawings I have illustrated several embodiments or applications of the invention illustrating typical variations of fixed and movable closures, and from this illustration and from other details of the drawings, it will be immediately apparent that the structure makes possible a wide variation in the arrangement or relationship of closures, all of which can, in practice, be carried out with little or no variation except as to the number and arrangement and selection of parts employed, accompanied, of course, by variations as to the size or length of elements employed.

In the drawings the opening 10 in wall W provided to receive the structure is established or defined by suitable frame-like elements 11 of the wall including, vertical elements as well as horizontal elements, and in Figs. 1 and 4 of the drawings, the lowermost element 11 is shown as a sill of concrete, or the like, whereas in Figs. 2, 3 and 6 of the lowermost element is shown as the simple member formed of wood, or the like, corresponding essentially in character to the uppermost element as shown in Fig. 4. When either a wooden lower element or concrete lower element 11 is employed, the building may include inward of the closure structure a floor surface 12 flush with the top of element 11 (see Fig. 6), or it may have flooring 13 to have a top surface 14 above the plane of the element 11 (see Fig. 4).

The structure as provided by the present invention includes generally a main or fixed frame and that element of the structure involves horizontal beams A and B and vertical elements or standards C and D between the beams. The horizontal beam A is at the bottom of the frame and will be hereinafter referred to as a base, whereas the other beam is at the top of the frame and will be hereinafter termed a header. In the case of the standards, the standards C are at the ends of the frame and will be termed end standards, while the standards D which will vary in number depending upon the manner in which the invention is employed, occur in the frame spaced from and located between the end standards and they will be termed intermediate standards. For purposes of assembly in the application of the invention shown in Fig. 1, there is a single intermediate standard C, whereas in the case illustrated in Fig. 2, there are two intermediate standards D. The main frame involving the elements A, B, C and D, as above stated, further includes corner couplings E connecting or coupling the end standards C to the base A and header B, and it includes intermediate couplings F connecting the intermediate standards to the base A and header B.

In the general construction provided by the present invention there is a plurality of closures including one or more fixed closures G and one or more movable closures H. A mounting means J is provided to support or mount each movable closure H for free sliding movement in the structure and is preferably confined to the lower end or edge portion of the closure. A guide means K is provided in connection with the movable closure preferably at the upper end or edge thereof, and is an anti-friction means, guiding that portion of the closure in the main frame.

In addition to the main or principal elements of the structure as above stated, there is a sealing means or bottom seal M at the lower portion of the movable closure, a top seal N at the upper end of the movable closure, an end seal P at the end of the movable closure that defines the opening made by the closure when the closure is open, which seal is effective when the closure is in the closed position, and end sealing means R serving to seal the movable closure at the other end when the closure is in the closed position. Further in carrying out the present invention, various auxiliary features or devices may be employed as, for instance, a fastening means Q for the movable closure, a screen S to supplement the movable closure and to be operated into working position to screen the opening established by the movable closure when it is in an open position, etc.

The base A, as provided by the invention, is an elongate, straight, rigid member uniform in form or cross section form, one end to the other, and it is preferably formed to have a top or planed-like body with sections side by side, and it has stringers that depend from the body to engage an element 11 of the building. In the preferred construction base A has what would be termed an inner section 20 at the innermost edge portion of the base and extending lengthwise of the base from one end to the other. The body has an outer section 21 at the outer edge portion of the base and extending lengthwise of the base from one end to the other. An intermediate section 22 of the body extends between and, in effect, connects the sections 20 and 21, and like the other sections extends from one end to the other end of the body.

The inner section 20 of the base or body of the base is provided to underlie or to occur beneath any movable closure employed in the structure, and since any movable closure is preferably inward of or located to operate behind any fixed closure the section 20 is at the inner edge portion of the base. In the preferred construction section 20 is simple of form and presents a substantially flat, smooth, horizontally disclosed top face 23.

The intermediate section 22 is adapted to occur beneath or under any fixed closure employed in the structure, and since the fixed and movable closures are established in rather close over-lapping relation the section 22 adjoins the section 20 that projects outwardly therefrom or toward the outer edge or outer section 21 of the base. In the preferred construction the section 22 is simple in form and presents a flat, smooth top face 24 and this face is preferably inclined or pitched to extend outward and somewhat downward from the point where section 22 joins section 20, as clearly shown in Fig. 4 of the drawings. The outer section 21 of the base A is employed particularly when the structure is to accommodate a screen S, and it is shown as a simple, horizontally disposed section with a flat upper side 25 and it is shown at its outer edge, which is the outermost edge of the base 20, with an upwardly projecting flange 26 adapted to serve as a retainer for the lower edge portion of screen S.

In accordance with the invention the base 20 is provided with a plurality of stringers that depend from the sections of the base, as hereinabove described, and in the case illustrated there is an inner stringer 26ª depending from extension 27 of section 20, and there is an outer stringer 28 depending from the portion of the base where sections 21 and 22 connect, and there is an intermediate stringer 29 depending from section 20 to be directly beneath any movable closure carried by the structure. The extension 27 of section 20 projects inward from the portion of section 20 that is beneath the movable closure and it has a suitably trained or rounded top face 30 as clearly shown in Fig. 4. In accordance with the invention the lower edges of the several stringers 26, 28 and 29 are flat and straight and occur in a common plane to bear or rest upon the top 31 of an element 11 as shown in Figs. 4 and 6 of the drawings.

In carrying out the present invention it is preferred to form the base A so that the outer section 21 thereof projects forward from where the stringer 28 occurs and is spaced above the face 31 of the building element 11 so that this portion of the construction can be employed to carry a seal or a body of sealing material as circumstances may require. In Fig. 4 an extension sill 32 is shown carried in that space and held by a depending lip 33 on section 25 and the sill projects forward from the base A and over-hangs the foremost edge of building element 11. In Fig. 6 a seal 32ª is illustrated and this seal is in the form of a packing or sealing material filling the space above mentioned.

The header B of the main frame is an elongate, straight, rigid member uniform in cross sectional configuration from one end to the other, and in accordance with the invention it has portions or sections corresponding to the above described sections of base A. The sections of the header vary somewhat in form from the sections of the base, and in the preferred construction there is an inner section 35 substantially coextensive with section 20 of base A and overlying that section, a section 36 substantially coextensive with section 22 of base A and overlying that section, and a section 37 substantially coextensive with and overlying the outer section 21 of base B.

The section 35 of the header B is at the innermost edge portion of the header and extends longitudinally of the header from one end to the other, and in its preferred form it is channel-shaped or U-shaped in cross section and has a web 40, an inner side wall 41, and an outer side wall 42. The web 40 is a simple, flat, horizontally disposed part at the uppermost portion of the beam B, while the walls 41 and 42 are flat, plain, parallel walls depending from the edges of the web 40 so that the channel formed by section 35 opens or faces downwardly as shown in Fig. 4. In the preferred construction the innermost wall 41 of section 35 is of substantial extent vertically and has a lower edge 44 that is straight and horizontally disposed. The outermost wall 42 is of less vertical extent than wall 41, and its lower edge or end terminates at 45.

The intermediate section 36 of the header establishes a channel or is U-shaped in cross section, is adjacent to the inner section 35 and is oppositely arranged, that is, it faces or opens upwardly instead of downwardly. In the case illustrated section 35 has a web 46 and inner side walls 47, and an outer side wall 48. The web 46 is a simple, flat, horizontally disposed part located a slight distance below the edge 44 of wall 41. The innermost edge of the web 46 is spaced outwardly from the plane of wall 42 and the innermost wall 47 of section 36 extends upwardly and inwardly from the innermost edge of web 46 to the terminal part 45 of wall 44 (see Fig. 4). The outermost wall 48 of section 36 is a simple, flat, vertically disposed wall extending upwardly from the outermost edge of web 46 to terminate flush with the web 40 of section 35.

The outer section 36 of the header B has a web 50 which is a flat, horizontally disposed part joining the upper terminal edge of wall 48 and projecting outward therefrom, flush with or in the plane of web 40 of section 35. The section 36 further includes a front wall 51 which depends from the foremost edge of web 50 and extends down a substantial distance to terminate at a horizontal edge 52. A screen supporting rail 53 is carried by the wall 51 at the inner side thereof.

The end standards C as provided by the invention are alike and in the preferred construction each is a rigid, straight, elongate unit having parts or sections corresponding generally to the section of the base and header as hereinabove described. In the preferred construction each end standard C has an inner section 55, an outer section 56, and an intermediate section 57.

In the preferred construction the outer section 55 establishes a channel or is U-shaped and has a web 60 and an innermost side wall 61 and an outermost side wall 62. The several parts of section 55 are arranged and related so that when the structure is assembled the outer wall 61 adjoins and is flush with the wall 41 of header B, while the wall 62 is substantially flush with the wall 42 of the header. It is to be observed from Fig. 5 of the drawings, that the walls 61 and 62 project from the web 60 so that the channel established by the two standards C open toward each other.

Section 57 of each channel is immediately outward of section 55 and in the structure shown includes, a web 63 and an inner wall 64 projecting from the innermost edge of web 63, and spaced from and parallel with the wall 62 projecting from web 60. An extension 65 of wall 66 projects laterally therefrom and adjoins the outer terminal edge of wall 62. The section 57 further includes, an outer wall 66 which projects from the outermost edge of web 63 in the direction opposite to that in which wall 64 projects. The wall 66 extends to the building element 11 defining the opening in which the structure is installed.

Section 56 of each end standard C includes, a web 68 which is flat and parallel with the webs 60 and 63 and which adjoins the wall 66 to engage the wall of the opening established in the building where the structure is installed. Section 57 has an outer wall 69 projecting from the outermost edge of the web 68 as do the walls 61 and 62 from web 60. It will be observed from Fig. 5 of the drawings that the several walls 61, 62, 64 and 69 that project in like manner, have terminal edges 70 which are flush or which occur in a common plane.

In the preferred construction each end post C has supporting flanges thereon, and in the case illustrated there is a supporting flange 71 or section 55 projecting from that section opposite a wall 66 and flush therewith, and there is a supporting flange 72 projecting opposite wall 66. The flanges 71 and 72 have edges 73 flush with or in the plane of the web 68 so that the standard will fit into or against an element 11 as shown in Fig. 5 of the drawings. In carrying out the invention the closures involved may vary in number, and with variation as to the number of closures there will be a variation as to the number of intermediate standards D employed in the construction. Each standard D as employed is preferably in the form of a simple, straight, elongate post and it is preferably hollow. In the preferred construction the intermediate B involves a plurality of substantially flat, straight walls which in combination establish a standard substantially rectangular in planed configuration. In the case illustrated the standard D includes, an outer wall 80, an inner wall 81 and side walls 82. In the case illustrated the walls 80 and 82 are integrally joined and form a unit whereas wall 81 is formed separate from the other parts of standard D and has elongate ribs 84 projecting from it and carried in recesses 85 provided in the walls 82. Standard D is of such size and shape that when it is coupled between the base and header as hereinafter described, wall 80 is in line with or in the plane of walls 66 of the end standards, while wall 81 is in line or in the plane of walls 64 of the end standards.

The corner couplers E, as provided by the present invention, serve to connect the beams and the end standards of the main frame. In carrying out the invention the corner couplers E occurring at the ends of the header B may vary slightly from those occurring at the ends of base A. However, in accordance with the invention, the several corner couplers are essentially alike. In accordance with the present invention each corner coupler E includes generally a corner block 90, a horizontally projecting tongue 91 engageable with the beam, and a vertically depending tongue 92 engageable with a standard.

The block E may, in practice, correspond with the elements joined by the coupler, that is, with the end standard and with the header. In the case of the corner coupler E shown in Fig. 10, the horizontal tongue 90 projects horizontally from the corner block and depends therefrom, and is located on the block and is of such width as to fit into or to be received by the upwardly opening channel 93 established by the sections of the header, and more specifically, by the walls 42, 47, 48 and web 46. In the preferred construction the tongue 91 is of such cross sectional configuration as to accurately and snugly fit into the channel thus formed by the header B as shown in Fig. 4 of the drawings. In practice, the tongue 91 may be solid in cross section, however, in the case shown the channel 93 is of substantial depth and width and it is therefore preferred to hollow or core out the tongue 91 so that it has a cavity 94 therein as shown in the drawings.

The depending tongue 92 projects downwardly a substantial distance from the corner block 90, and is adapted to enter or be engaged in the upper end portion of an end standard. In the case illustrated the tongue 92 is received in the channel defined in the end standard by walls 66, 71 and the webs 70 and 61. Where a rib 72 is provided as shown in the drawings, the tongue 92 has a recess 95 to receive or accommodate it.

From the drawings it will be immediately apparent that the corner couplers E at the ends of the header B are alike but oppositely disposed.

In the case of the corner couplers at the corners between the end standards and base A, each corner coupler has a corner block 90, and a horizontally disposed tongue 91ª, and a vertically projecting tongue 92ª. The corner block 90 occurs at or adjacent to the terminal end of the base A and at the lower end of the end standard C. The horizontally disposed tongue 91ª extends into the channel or cavity established beneath the body of base A and where there is an intermediate stringer depending from the body such as the stringer 29 above described, the tongue 91ª is provided with a recess 95ª to receive that stringer. In the case of the vertically projecting tongue 92ª it projects upwardly from the corner 90 and in the case illustrated, it may have a recess 95 to accommodate part 72 as above described.

In carrying out the invention the various parts thus far described are such that they can, in practice, be made accurately and at little cost and they may be made to fit tightly or snugly together so that a few simple fasteners are required to secure the main frame in assembled condition. In carrying out the invention it is contemplated that any suitable fastening means may be employed to connect the corner couplers E with the parts engaged therewith. In the case illustrated simple screw fasteners 99 are shown employed for this purpose and arranged at various points where they do not interfere with other elements of the structure and where they are accessible and located where they can be easily applied. Further, it will be apparent from the foregoing description that the main frame of the structure, as above described, may be easily installed or inserted in a wall opening and when in place it may be made fast or secured by any suitable fastening means. In the drawings and for purposes of assembly, the suitable simple screw fasteners 100 are shown provided for this purpose. These fasteners, like the fasteners 99 employed in the frame, may be arranged where convenient and may vary in number as circumstances require.

The intermediate couplers F serve to connect the ends of the intermediate standard D with the head and base and in the preferred construction, the couplers F at the two ends of each intermediate standard are substantially alike and each includes, a head 105, and a tongue 106 projecting from the head. In the case of the coupler at the upper end of standard D, the tongue 106 is snugly received in the open upper end of the standard, while the head on the upper end of the tongue is received in a notch or opening 107 provided in web 46 of header section 36 and rests upon the upper side of web 46 so that the tongue depends in a position to hold the standard D in proper alignment beneath the web 46.

At the lower end of standard D the coupler F has its tongue 106 projecting up into the lower end of the standard and the head 105ª of this coupler is received beneath the base section 22 to project up through an opening provided in that section of the base so that the lower end of the standard is held in proper alignment or directly beneath the upper end of that standard.

It is to be understood that in carrying out the invention the base A and header B can be readily notched wherever desired to accommodate couplers F so that intermediate standards can be established in the frame wherever desired. Furthermore, it is to be understood that, in practice, the couplers F may be suitably secured to the parts engaged thereby, for instance, in practice, they can be connected with or to the engaged parts by means of suitable screw fasteners 108.

In the case of each fixed closure as provided by the invention, it is preferred that the structure be such as to include, a panel 110 of glass, or the like, that there be a spacer 111 related to and arranged beneath the panel 110, that there be suitable supporting means 112 for the panel and suitable retaining means 113 to hold the panel in place.

The construction provided for the fixed panel is best illustrated in Figs. 4 and 9 of the drawings, from which it will be apparent that the panel 110 of glass, or the like, may be a simple, flat, rectangular sheet or pane of glass. The spacer 111 is preferably an elongate member or unit of such length as to extend between the standard, between which the panel 110 is to occur, and this spacer is located between the lower end portions of those standards and is supported on the base A. The spacer 113, as shown in the drawings, is an elongate, rigid member of uniform size and shape from one end to the other, and it has a flat web portion 114 and depending side walls 115. When the spacer 113 is in place one end abuts a side wall 82 of an intermediate standard, while the other end abuts the web 63 of section 57 of an end standard. The web 114 of the spacer corresponds in width with web 46 and the walls 82 so that when the spacer is in place these parts are aligned as shown in the the drawings.

In practice, any suitable means may be provided to suitably secure the spacer 113 in place. In the case illustrated U-shaped brackets 120 are provided to fit into the end portions of the spacer and these brackets are secured to the wall 82 and web 63 between which the spacer extends. It will be understood that any suitable means may be employed to fasten or anchor the walls 115 of the spacer to the flange of the U-shaped brackets.

The means 112 provided to support the panel 110 is preferably provided by flanges 122 in the nature of glazing flanges. In the preferred construction a glazing flange 122 projects up from the spacer 113 as, for instance, from and in alignment with the innermost wall 115 of the spacer, while a corresponding flange depends from the web 46 of header section 36 where the web 46 joins wall 47. If the panel is to be engaged with an end standard, wall 64 of the intermediate section 47 thereof, will support the panel, whereas if the panel is to engage an intermediate standard D that standard is provided with a glazing flange projecting from wall 81. When but one panel abuts an intermediate standard D one glazing flange 122 projects therefrom as shown in Fig. 5, whereas if two panels are to abut a single intermediate standard two intermediate flanges are provided thereon as shown in Fig. 8.

The retaining means 113 as shown in the drawings, includes under-cut or dove-tailed beads 130 projecting from walls or webs where the edges of the panel occur. In the case illustrated these beads are provided at or on the webs 46, 114, 63 and the walls 82 as shown throughout the drawings. The beads 130 in and of themselves are not sufficient to retain the panel, however, they are supplemented by ribs 131 preferably in the form of spring clips or elongate strips of sheet metal U-shaped in cross section and applied to the beads as shown throughout the drawings. These clip-like ribs can be snapped into placed and pried loose as required. Further, in practice, it is preferred to provide a suitable seal or leak-proof cushion 135 round the panel at the edges thereof as shown in the drawings.

The movable closure H as provided by the present invention includes, a frame preferably a rigid, rectangular frame carrying a panel 140, such as a panel of glass, or the like.

In the case illustrated the frame of the movable closure is shown as including, a plurality of elongate members or sections defining openings or channels, there being a bottom section 141, a top section 142, a front or leading end section 143, and a back or trailing section 144.

The bottom section 141 is preferably a straight, rigid, elongate member uniform in cross section from one end to the other, and it is preferably formed to have a top web 150 and innermost side wall 151 depending from the web, and an outermost side wall 152 depending from the web. The web 150 is similar generally to web 114 of spacer 113 and is flush therewith or in a common plane therewith as shown in Fig. 4. The walls 151 and 152 depend to points close to the base A where they terminate leaving clearance between section 141 and the base as shown in Fig. 4. The bottom section 141 being thus formed establishes a channel or is U-shaped and opens downwardly over section 20 of base A.

The top section of the closure frame is preferably an elongate hollow or tubular member corresponding in length with section 141. In the form illustrated the top section includes, a top wall 160, a bottom wall or web 161, and vertical side walls 162. In the particular case illustrated the top wall 160 and the side walls 162 are integrally joined and form a unit, whereas the wall or web 161 is separate or detachable from the other parts. In the case illustrated the separable parts are joined or connected by a flange 163 projecting up from the web 161 and having a lip 164 overlying a rib 165 projecting inward from the lower end of a wall 162. In the preferred construction there is a rib on each wall 162 and flanges 163 on web 161 having lips 164 cooperating with the rib as shown in the drawings. With this construction the parts of the top section 142 can be readily assembled or slid together end-wise prior to establishing the top section in the frame.

In the preferred construction keys 165 project from the web 161 and engage in corresponding grooves in the lower ends of walls 162 so that when the structure is assembled the walls 162 are held against spreading.

The end sections 143 and 144 of the closure frame are preferably substantially alike, and in the preferred construction each is an elongate, hollow or tubular member. The leading end section is shown as including, a leading wall 170, side walls 171, and a wall or web 172. These walls form an assembly or section that is substantially rectangular in planed configuration. In the preferred construction walls 170 and 171 are integrally connected or joined, whereas wall 172 is formed separate and is joined to the walls 171 by a construction corresponding to that by which web 161 is joined to walls 162. The trailing end section 144 has a trailing end wall 180, side walls 181, and a wall or web 182, which parts combine to form a structure rectangular in planed configuration.

The walls 180 and 181 of section 144 are integrally connected whereas wall or web 182 is separate and is joined to the walls 144 by construction corresponding to that connecting web 161 and walls 162 of section 142.

In accordance with the invention corner couplings 190 are provided to connect the section of the closure frame at the corners thereof, and each of these corner couplers is a substantially L-shaped member. The corner coupler 190 provided to connect the upper end of an end section with an end of the top section 143 is shown as including, two tongues joined together and being a depending tongue 191 engageable in the end section, and a tongue 192 engageable in the tubular top section. It is to be understood that when the coupler is engaged with the sections of the frame the coupled parts can be held together by any suitable fastening means such as screw fasteners shown in connection with the couplers hereinabove described.

Coupler 190 provided to connect the lower end of each end section with the bottom section 141 has a tongue 191a projecting up to fit into the lower end of the end section of the frame, and it has a tongue 192a projecting horizontally to fit into the downwardly opening U-shaped bottom section 141. The tongue 192a is U-shaped in cross section and downwardly opening or facing so that it has spaced parallel sides 195 seated against the inner sides of walls 152 of section 141 of the closure frame.

The panel 140 of the movable closure fits into the frame formed by the sections 141, 142, 143 and 144, and a supporting means 200 supports the panel in this frame. The supporting means 200 preferably includes, glazing flanges 201 projecting from the innermost edges of the web parts 172, 182, 150 and 161. A suitable retaining means 202 is provided to retain the panel 140, and as shown in the drawings this may correspond in construction with the retaining means provided to retain the panel of the fixed or stationary closure.

Furthermore, it is to be understood that a suitable seal 135 may, in practice, be employed around the edges of panel 140.

The mounting means J is provided to support the movable closure H for reciprocatory movement in the main frame of the structure at the inner portion thereof, that is, inward of any fixed closure G mounted in the frame. In accordance with the present invention the mounting means J serves to support the movable closure H from the base A and thus supports or carries the closure from its lower edge portion.

The mounting means as provided by the present invention includes generally a rail 200 carried by or located in the base A, and a plurality of lower assemblies 201 carried by the bottom section 141 of the frame of the movable closure H. In the particular case illustrated there are two lower assemblies 201 and these are located at the end portions of section 141, in effect, they are mounted in the section 141 through or by means of tongues 192ª of couplers 190 which tongues are located in the ends of section 141.

The rail 200 is preferably a simple, straight strip or unit of steel, or like material, and in accordance with the preferred construction is carried by or in a groove 203 formed in section 20 of the base A and extending downwardly into the stringer 29 occurring beneath section 20. When this construction is employed the stringer 29 is of heavy construction or of substantial width to accommodate the groove 203 as shown in Fig. 4 of the drawings. The rail 200 is preferably formed of sheet metal and is U-shaped in cross sectional configuration and is arranged so that the web portion 204 forms the top or roller carrying portion of the rail while the side portions 205 depend into the groove 203. The parts are proportioned so that the web or roller carrying portion 204 projects above the top 23 of section 20 to support rollers clear of the top of section 20. The sides 205 of the rail depend into the groove 203 and are anchored therein by projections 206 on the terminal edges of the sides, which projections engage into undercut recesses 207 in the groove 203 at the bottom thereof. By forming the rail of sheet metal having resilience and by suitably proportioning the parts, the rail can be engaged in the groove by slightly collapsing the sides of the rail, and when the rail reaches working position the projections 206 snap into the recesses 207.

In accordance with the preferred form of the invention the roller 201 of the assembly J are alike, and in the preferred construction as illustrated in the drawings, each assembly includes, a lower carrier, a pivot pin, and a roller. The roller carrier is preferably U-shaped in cross sectional configuration and has a web portion 210 seated against the top or web 211 of tongue 192ª, and it has depending sides 212. The roller 213 is arranged between the sides 212 of the bracket and projects downwardly therefrom, and the mounting pin 214 is carried by and extends between the sides 212 to support the roller 213 in the bracket.

In the construction illustrated the tongue 192ª is of substantial width to fit into and occupy the panel provided in frame section 141 of the closure H, and therefore the side walls 195 of the tongue are spaced a substantial distance apart. The carrier 212 is, in this case, narrower than the space between the walls 195 and therefore a spacer 215 in the form of a block is arranged between one of the walls 195 and one of the sides 212 of the carrier as shown in the drawings.

When this construction is employed the pin 214 preferably extends into an opening in the other wall 195 of tongue 192ª and also into the spacer 215 as shown in Fig. 4 of the drawings. The opening in the tongue and in the spacer accommodating the pin may be notches 120 as shown in Fig. 17 of the drawings.

The roller 213 is preferably a simple, plain roller with a grooved periphery, and the roller supporting part 204 of the rail is preferably shaped to fit into the groove of the roller, with the result that these parts cooperate so that the roller is maintained on the rail as the closure operates back and forth in the main frame.

In practice, it is desirable to anchor or secure the roller carrier 212 in the frame section 141 or in the element in the frame section that is engaged by the carrier. In the case illustrated a screw fastener 220 is shown securing the carrier 212 in the tongue which, in turn, is secured in the section 141.

The guide means K provided by the invention serves to guide the upper portion of the movable closure H in the header B. In the preferred construction the guide means K serves to guide the top section 142 of the closure frame in the section 35 of the header. The invention provides a plurality of guide rollers 222 on the frame section 142 and these rollers are spaced apart longitudinally of section 142. In the preferred construction as shown in the drawings, there is the guide roller at each end portion of section 142 and each guide roller is carried by a vertically disposed pin 225 projecting up from an end portion of section 142. In the case illustrated the roller 222 is located above the web 160 of section 142 and the pin 225 extends down through the web through a spacer roller 226 between the roller and the web 160 through the tongue 192 of the corner coupler 190 at that end of section 142, and a retainer or nut 228 is provided on the pin below the web 230 of tongue 192, as will be understood from Figs. 4 and 15 of the drawings.

In accordance with the present invention the guide roller 222 is of a diameter greater than the width of the section 142 of the closure frame of the roller, is so mounted as to project somewhat laterally from each side of section 142. Further, the roller 222 is preferably slightly smaller in diameter than the space between walls 41 and 42 of header section 35. Through this construction the guide roller maintains the frame section 142 in the desired position in the header, spaced from the walls or parts thereof, and maintains the upper portion of closure H against any appreciable lateral movement of shifting while, at the same time, supporting it for free reciprocation parallel with the section 35 of the header B.

The sealing means M, which is a bottom seal acting between the bottom section 141 of the closure frame and the base A, preferably includes, a simple, elongate substantially rigid sealing member 240 having vertical sliding engagement with the section 141 and having a straight, smooth, lower edge 241 having sliding engagement with a straight, smooth part of the base A. In the construction illustrated the sealing member 240 is carried by one of the walls of section 141, preferably the outermost wall, and it is carried to normally depend from the wall 152 and into a suitable groove 243 in base A between sections 20 and 22 thereof, and having a smooth bottom slidably engaged by the edge 241 of the sealing member. In the construction illustrated a flange 244 is provided at the inner side of wall 152 at the lower portion thereof, and this flange is spaced from wall 152 providing a downwardly opening channel 246 slidably carrying the sealing member 240. In accordance with the invention the sealing member 240 is preferably a simple, flat strip with smooth, parallel sides and it is carried in the channel 246 to be slidable therein so that it is normally maintained in sealing engagement with the bottom of the groove 243 by the action of gravity. In practice, the base of the main frame is preferably formed of metal, while the sealing strip 240 is preferably formed of a softer material, say for instance, a fibrous composition such as material commonly known as Bakelite. The sealing strip is coextensive with section 141 and thus seals the lower side or bottom of the movable closure from one end to the other thereof.

The top seal or sealing means N is provided to seal at the top section 142 of the movable closure, and in the preferred form of the invention this means includes, a simple, straight, elongate sealing member 250 coextensive with section 142 of the movable closure and having sealing engagement with that section and also with a wall of the header. In the preferred construction the sealing member 250 has sealing engagement with wall 41 of section 35 of the header and seals against the inner side of that wall, while it seals against the web 160 of section 142 of the closure frame. In the preferred form of the invention the sealing member 250 is a tubular member of suitable material having a smooth, round exterior 251, and the edge portion 253 of web 160 engaged by the sealing member 250 is pitched or inclined to extend toward wall 41 and downwardly, thus establishing a downwardly convergent opening in which the member 250 is engaged and held. With the construction just described the sealing member 250 is held by gravity in sealing engagement with wall 41 and web 160.

The sealing member 250 extends the entire length of section 142, and in accordance with the invention its end portions overlie the corner couplers occurring at the ends of section 142, and lugs or stops 258 are provided on the corner couplers 190 to hold the sealing member 250 against movement lengthwise of section 142.

The end seal P curves at and serves to seal the leading end or edge of the movable closure H, and in accordance with the preferred form of the invention this means includes, an elongate sealing member 260 carried by the section 143 of the movable closure to project from the wall 170 thereof and from the outer side of that wall so that it engages and seals with web 60 of section 35 of the standard C adjacent to section 141 when the closure H is in the closed position. The sealing strip 260 in its preferred form is an elongate strip of resilient material, for instance, it may be formed of a sheet of resilient metal and it is arranged at the outer side of wall 170 with its edges 261 bearing on wall 170 while its convex face 262 faces the web 60 with which it is to cooperate. Retaining flanges 263 are provided on the section 140 to project therefrom beyond wall 170, and these projections overlie the edge portions of the sealing member 260.

In the preferred construction the web 60 of standard section 55 to be engaged by the sealing member 260 is preferably provided with a projecting portion having a convex face 270 that opposes and which is engaged by the convex face 262 of the sealing member.

With the construction above described it is preferred that the sealing member 260 be held or retained by the projections 263 so that it will not shift lengthwise unless deliberately forced, and it is preferably coextensive with the section 143 of the closure frame.

The sealing means R as provided by the present invention serves to seal between the back or trailing edge portion of the movable closure and an intermediate standard D when the movable closure is in the closed position. In the preferred form of the means R a sealing lip is provided on or carried by one part, say for instance, by the movable closure and a body of sealing material is carried by the other member, say for instance, by the intermediate standard D, and these parts are related so that when the closure H is in the closed position the sealing lip engages and has sealing engagement with the said body of sealing material.

In the preferred form of the invention there is a sealing lip 300 on each of the parts, that is, on the movable closure as well as upon the intermediate standard D, and there is a body of sealing material 301 carried by each part, that is, one body of sealing material carried by the closure and another carried by the standard. When this construction is employed a flange-like extension 302 is provided on wall 180 of the closure frame section 144 to project outwardly therefrom, and the sealing lip projects from the flange 302 and extends parallel with and spaced outward from the wall 181 of section 144. The construction just described provides a channel 302 at the outer side of section 144 facing toward the leading end of the closure or toward section 143 thereof.

At the standard D there is a flange-like extension 305 on the standard located to be, in effect, an extension of the wall or web 82 though it is formed as a part of the wall 81. A sealing lip 300 is carried by and projects from the flange 305 to be parallel with and spaced from the wall 81 forming a channel 302 facing or opening toward the closure section 144 that is channeled and which carries the body of sealing material as above described. The sealing lips 300 have straight, vertical projecting or sealing edges 310 and the parts, as above described, are arranged and related so that the sealing lips 300 overlap when the movable closure H is in closed position, and the bodies of packing 301 are such that when the parts are thus positioned the edges 310 are in sealing engagement with the bodies of packing. It is to be understood that the sealing means R, as above described, extends from top to bottom of the movable closure.

In carrying out the present invention various accessories can be incorporated in the structure, for example, a fastening means Q of any suitable form and construction can be employed to hold the movable closure in any desired position. In the case illustrated a fastening means is illustrated to latch or lock the movable closure in the closed position. But it is to be understood that any suitable latch or lock mechanism can be employed as circumstances require.

In the construction as above described and from the drawings, it will be observed that the sections 21, 37 and 56 of the base, header and end standards, respectively, establish a chamber or cavity 300 in the outer portion of the main frame that can be used to advantage to accommodate a screen S, and if desired the screen employed can be provided with rollers 301 carried by the rail 53 on wall 51 of section 37 so that the screen is mounted to reciprocate in a manner similar to the movable closure.

The several sections of the main frame, as above described and as shown in the drawings, in effect, form a frame establishing a closure carrying chamber in the rear side portion thereof, a chamber in the forward side portion adapted to carry a screen, or the like, and a chamber in the intermediate portion adapted to carry a closure. In accordance with the invention one or more movable closures may be provided in the chamber at the inner side portion of the main frame, and one or more fixed closures can be provided in the intermediate chamber of the main frame.

In a construction where a movable closure in the inner chamber of the main frame is to be stopped short of travel from one end to the other of the main frame, one of the intermediate standards B is provided with or carries a stop 320. In the drawings the stop 320 is best illustrated in Figs. 7 and 20 and in the particular case illustrated, the stop 320 is in the form of an elongate, vertically disposed wall coextensive with the intermediate standard on which it occurs. The stop wall 320, in the case shown, is on or carried by an intermediate standard, wall 320 is shown on a standard having flange parts 305 and 300 projecting therefrom as above described, forming parts of sealing means R.

The stop wall 320 in this case is formed as an extension or projection on part 305 and it projects therefrom into the path of the movable closure H. In the preferred construction the stop wall 320 is formed similar to and is, in effect, the same as a web 60 of section 55 of an end standard.

When a stop wall 320 is provided as shown in Figs. 7 and 20, it is preferred to provide an abutment 321 on the base A and an abutment 322 on the header B, which abutments engage the side of wall 320 opposite that engaged by the movable closure and are anchored to effectively support the stop wall and prevent its being damaged by the movable closure striking it. In the case illustrated, the abutment 321 is in the form of a block carried in the rail groove 206 of base A and secured in position by screw fasteners 325. The abutment 322 is shown as the depending arm of an L-shaped bracket secured to the web 40 of header section 35 by a suitable screw fastener 326.

With the extruded construction provided most of the elongate elements in the structure have straight, plain ends cut in planes transverse of the elements. Some of the cooperating parts that are side by side or engaged with each other to form an assembly may be somewhat different in length, for instance, unit formed by the walls 170 and 171 of section 143 is shorter than the web 172. Also where parts come together they are made to fit as by making the glazing flange 122 on web 161 of section 142 somewhat shorter than the parts of that section.

From the foregoing description it is to be observed that the beams of the main frame, that is, the base A and header B, are, in effect, channel-shaped elements, and the channels established by these elements accommodate the horizontal tongues of the corner couplers E, and also accommodate the heads of the intermediate couplers F. It is further important to observe that the construction provided by the present invention is for the most part made up of elongate, rigid members that can, in practice, be advantageously formed as extrusions, these elements of the structure being shown in Fig. 19 of the drawings. From Fig. 19 it will be observed that the cross sectional configuration of the several elements there illustrated makes possible simple, practical formation by extrusion and results in involving a minimum of material, while at the same time being rigid and endurable. In addition to the extruded elements of the structure the other principal parts may be castings, for instance, the corner couplers employed throughout may be simple, inexpensive castings.

Considering the construction as a whole it involves very few operations on the basic elements, and these are simple cutting operations and the assembly of the structure can be carried out easily and quickly and without the use of special tools or the exercise of unusual care or skill. With the structure of the present invention a group of the necessary parts can be supplied where the structure is to be used, and with very little cutting and fitting the structure can be established in working position in a wall.

It is also highly important to observe that the structure as provided by the present invention is such as to present a smooth, clean, symmetrical appearance, the construction in general being without exposed projections or protuberances that interrupt the plain, smooth character of the exposed parts.

Having described only typical preferred forms and applications of my invention, I do not wish to be limited or restricted to the specific details herein set forth, but wish to reserve to myself any variations or modifications that may appear to those skilled in the art and fall within the scope of the following claims:

Having described my invention, I claim:

1. In combination, a main frame including, vertically spaced horizontal beams, one a base and the other a header, end standards extendng between the beams at the ends thereof, and intermediate standard extending between the beams and located intermediate the end standards, the beams and end standards having parts defining outwardly opening channels extending longitudinally thereof, corner couplers at the corners between the beams and end standards and having tongues secured in the outwardly opening channels of the beams and end standards, and intermediate couplers having heads carried in the outwardly opening channels of the beams and having tongues projecting through the beams engaging and holding the intermediate standard, the base having a substantially horizontal body with an inner section extending longitudinally thereof from one end of the base to the other, and having another section adjoining and outward of the inner section and extending from one end of the base to the other, and the header having an inner section extending longitudinally thereof from one end of the header to the other establishing a downwardly facing channel with vertical side walls, the channel being of substantial depth and located directly above the inner section of the base and having another section adjoining and outward of the channel forming section with a substantially flat wall directly above the said other section of the base and substantially flush with the lowermost part of the channel forming section, the said inner sections defining an inner closure chamber and the other sections defining an outer closure chamber, a movable closure in the inner chamber with its lower edge portion supported by the base and its upper edge portion in the channel of the header and guided thereby, the upper edge portion of the movable closure having inclined side edges, a fixed closure in the outer chamber between the base and header and between one end standard and the intermediate standard, and sealing means carried by and movable with the movable closure and including an elongate rigid sealing member carried by a downwardly opening channel in the lower portion of the movable closure and engageable in an upwardly opening groove in the base, an elongate rigid cylindrical sealing member carried by the upper portion of the movable closure adjacent one inclined side edge thereof and slidably engaging a vertical side wall of the channel in the header, a sealing member carried by the leading edge portion of the movable closure and engageable with an end standard, and a sealing member carried by the trailing edge portion of the movable closure and engageable with the intermediate standard.

2. In combination, a closure frame, a panel, means supporting the panel in the frame, means retaining the panel in the frame, the frame including, elongate top and bottom sections, an elongate leading end section and an elongate trailing end section, and including L-shaped corner couplers connecting the sections together at the corners of the frame, each section defining an elongate opening and the couplers having arms secured in said openings, mounting rollers adapted to support the frame, the top section having a top face adapted to carry a sealing member and extending from one end to the other of the frame and inclined downwardly toward one side of the frame, and stops at the ends of said face adapted to hold said sealing member engaged therewith.

3. A closure frame base elongate in form and having a body with an elongate inner section at the inner edge portion, an elongate outer section at the outer edge portion and an elongate intermediate section between and adjoining and connecting the inner and outer sections, and a plurality of elongate spaced stringers depending from the body and terminating in a common plane, there being one stringer beneath the inner section and there being a groove in the inner section and extending into the stringer beneath the inner section, there being a groove in the body where the inner and intermediate sections join and adapted to receive a sealing member and there being spaced grooves in the intermediate section adapted to receive parts of a fixed closure, the grooves being parallel with each other and all extending longitudinally of the base.

4. A vertical standard in a closure structure and including four substantially flat walls establishing a tubular unit rectangular in cross section, three of the walls being integrally joined at two of the corners of the unit, the other wall being separable from the integrally joined walls and connected thereto at the other corners of the unit, said other wall having a flange projecting therefrom, which flange projects from the exterior of the said unit parallel with a wall thereof and adapted to support a panel, one wall being adjacent the flange and in a plane normal thereto and having a bead projecting therefrom and adapted to carry a panel retainer.

5. A vertical standard in a closure structure and including four substantially flat walls establishing a tubular unit rectangular in cross section, three of the walls being integrally joined at two of the corners of the unit, the other wall being separable from the integrally joined walls and connected thereto at the other corners of the unit, said other wall having a flange projecting therefrom, which flange projects from the exterior of the said unit and being adapted to support a panel, the flange being in a plane normal to that of said other wall and said other wall having a bead projecting therefrom and adapted to carry a panel retainer, the integrally joined wall at the side of the unit opposite said other wall having a projection thereon adapted to retain a sealing member so it projects from the standard.

References Cited in the file of this patent

UNITED STATES PATENTS

| | | |
|---|---|---|
| 1,569,602 | Anderson | Jan. 12, 1926 |
| 2,169,865 | Banta | Aug. 15, 1939 |
| 2,607,453 | Smith | Aug. 19, 1952 |
| 2,636,580 | Bianco | Apr. 28, 1953 |
| 2,663,917 | Peterson | Dec. 29, 1953 |
| 2,666,508 | Nardulli | Jan. 19, 1954 |
| 2,680,269 | Watkins | June 8, 1954 |

FOREIGN PATENTS

| | | |
|---|---|---|
| 872,847 | Germany | Apr. 9, 1953 |